E. R. COX.
DEMOUNTABLE RIM.
APPLICATION FILED JUNE 7, 1912.

1,051,694.

Patented Jan. 28, 1913.

Inventor
E. R. Cox.

Witnesses
C. E. Kemper.
J. W. Gwinner.

By Victor J. Evans
Attorney

UNITED STATES PATENT OFFICE.

ELI R. COX, OF LADONIA, TEXAS.

DEMOUNTABLE RIM.

1,051,694.

Specification of Letters Patent. Patented Jan. 28, 1913.

Application filed June 7, 1912. Serial No. 702,295.

*To all whom it may concern:*

Be it known that I, ELI R. Cox, a citizen of the United States, residing at Ladonia, in the county of Fannin and State of Texas, have invented new and useful Improvements in Demountable Rims, of which the following is a specification.

This invention is an improved demountable rim for use on automobile wheels and by means of which a tire may be readily mounted and removed, the invention consisting in the construction, combination and arrangement of devices hereinafter described and claimed.

Figure 1:
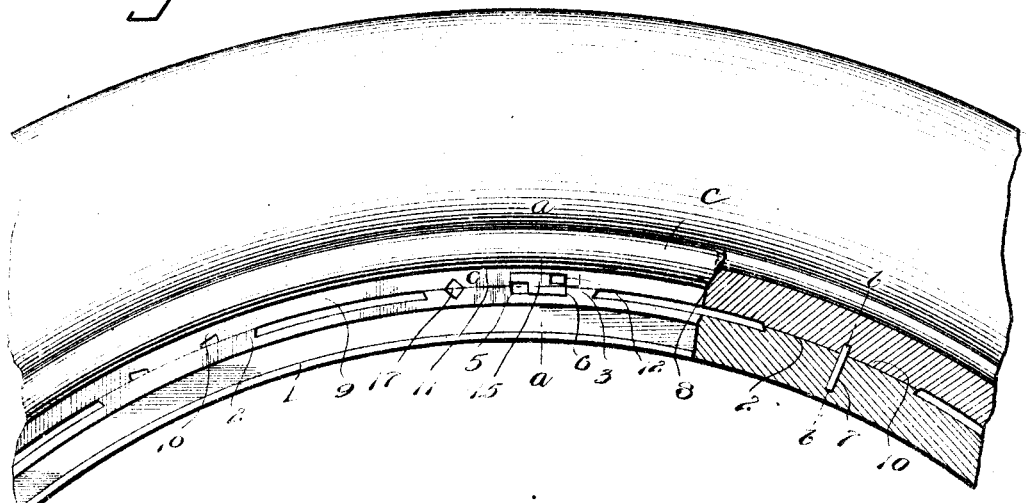
Figure 2:
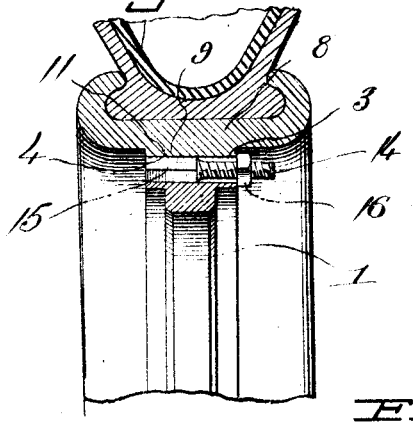
Figure 3:
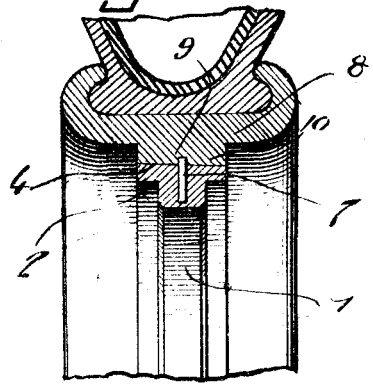
Figure 5:
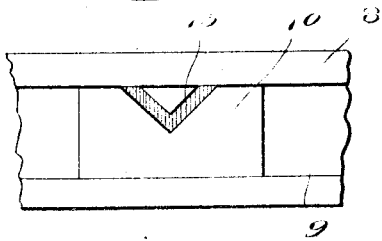
Figure 4:
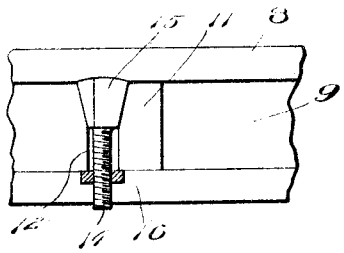

In the accompanying drawing:—Figure 1 is partly an elevation and partly a sectional view of a portion of the felly of a wheel provided with a demountable rim constructed in accordance with my invention. Fig. 2 is a detail sectional view on the plane indicated by the line a—a of Fig. 1. Fig. 3 is a similar view on the plane indicated by the line b—b of Fig. 1. Fig. 4 is a detail transverse sectional view on the plane indicated by the line c—c of Fig. 1. Fig. 5 is a detail plan of a portion of the demountable rim showing one of the lugs having a V-shaped groove.

The fixed rim of an automobile wheel is, for the purposes of this specification, indicated at 1 and in accordance with my invention is provided on its periphery with a series of lugs 2 and a lug 3, the said lugs being arranged at suitable regular distances apart. The peripheral surfaces of the said lugs are inclined as at 4 so that in effect the extreme diameter of the fixed rim is greater on the inner side of the wheel than on the outer side thereof and the fixed rim is practically of truncated conical form. The lug 3 is provided with a transverse groove 5 which is widened at its outer end as at 6 at the side corresponding with the outer side of the wheel. Each of the lugs 2 is provided with a centrally arranged radial projecting locking stud 7. The demountable rim 8 is provided on its inner side with a centrally arranged annular flange 9 which flange is provided with inwardly projecting radially arranged lugs 10—11 which correspond, respectively, with the lugs 3—2, the inner faces of which converge in one direction so that in effect the inner diameter of the lug flange of the demountable rim is smaller at the outer side of the demountable rim than at the inner side thereof. The demountable rim is adapted to fit on the fixed rim of the wheel with its lug 11 in engagement with the lug 3 and its lugs 10 in engagement with the lugs 2. The lug 10 has a groove 12 which corresponds with the groove 5 and each of the lugs 10 is provided with a V-shaped groove 13, the said grooves 13 being adapted to receive the studs 7 of the fixed rim. The said studs are so spaced from the outer side of the fixed rim that when they are engaged with the grooves 13, each of the said studs will be in one arm of one of said grooves at a point about midway between its inner and outer ends. Owing to the inclined arrangement of the arms of the grooves 13 the tendency of the studs 7 will be to lock the demountable rim on the fixed rim under the driving stress and in assembling the parts the studs 7 should be arranged in the front arms of the grooves 13 or in other words, in those arms of the grooves which are in front when the wheels revolve in the direction required to drive the vehicle ahead. Owing to the substantial frusto-conical form of the fixed rim and the similar form of the seat formed in the demountable rim, the latter is prevented from slipping laterally in one direction. To effectually prevent the demountable rim from casually slipping in the reverse direction, I provide a bolt 14, the stem of which is arranged to pass through the opening in the opposing faces of the lugs 3—11 formed by the grooves 5—12 and the head of which is wedge-shaped as at 15 and is adapted to fit in the correspondingly shaped outer end of the said opening.

The nut 16 bears against the shoulders formed by those ends of the lugs 3—11 which are on the inner side of the wheel and serves to hold the locking bolt in place, as will be understood. In practice, this nut will be provided with some suitable means for locking the same on the threaded portion of the stem of the bolt to keep it from becoming casually detached therefrom. In order to detach the demountable rim from the fixed rim, it is only necessary to first take out the bolt 14 and the demountable rim can then be readily removed from the fixed rim. Any suitable form of tire may be used on the demountable rim and the exterior construction of the demountable rim may be such as is required to enable the tire to be secured thereon.

By provision of the V-shaped grooves 13, the said grooves each provide an inclined or angularly arranged arm for engagement by one of the studs of the fixed rim according to the side of the car in which the wheel is used.

In order to facilitate the removal of the demountable rim from the fixed rim, I provide the opposing and bearing surfaces or lugs of the demountable rim and fixed rim with transverse cross sectionally rectangular openings 17 to receive the correspondingly shaped shank of a tool or tools, such as a wrench which may be used to start the demountable rim in the event that it should stick.

While I have herein shown and described a preferred form of my invention, I would have it understood that changes may be made in the form, proportion and construction of the several parts without departing from the spirit of my invention and within the scope of the appended claim.

I claim:—

In combination with a fixed wheel rim provided with peripheral lugs having radial studs and also provided with a peripheral lug having a transverse groove widened at one side of said rim, a demountable rim having an annular flange on its inner side provided with inwardly projecting radial lugs to fit on the first-mentioned lugs of the fixed rim and provided with V-shaped grooves to receive the studs of said first-mentioned lugs, said grooves extending to and being open at one side of the demountable rim, the said demountable rim being also provided with a lug to fit on the other lug of the fixed rim having a transverse groove widened at one side of said demountable rim, a bolt in said transverse grooves of said rims and having a wedge-shaped head fitting in the widened portions of said grooves, and a nut on the stem of the bolt and bearing against the shoulders formed by the said transversely grooved lugs.

In testimony whereof I affix my signature in presence of two witnesses.

ELI R. COX.

Witnesses:
 A. B. Cox,
 P. T. Hoous.

---

Copies of this patent may be obtained for five cents each, by addressing the "Commissioner of Patents, Washington, D. C."